(12) United States Patent
Zhong et al.

(10) Patent No.: US 9,746,038 B2
(45) Date of Patent: Aug. 29, 2017

(54) DUAL ACTUATION BALL CONTOUR SYNCHRONIZING CLUTCH

(71) Applicant: Schaeffler Technologies AG & Co. KG, Herzogenaurach (DE)

(72) Inventors: Guihui Zhong, Charlotte, NC (US); Marion Jack Ince, Mount Holly, NC (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 127 days.

(21) Appl. No.: 14/922,654

(22) Filed: Oct. 26, 2015

(65) Prior Publication Data

US 2017/0114839 A1 Apr. 27, 2017

(51) Int. Cl.
  *F16D 23/06* (2006.01)
  *F16D 23/02* (2006.01)

(52) U.S. Cl.
  CPC ........... *F16D 23/025* (2013.01); *F16D 23/06* (2013.01); *F16D 2023/0618* (2013.01); *F16D 2023/0681* (2013.01); *F16D 2023/0693* (2013.01)

(58) Field of Classification Search
  CPC ........ F16D 23/025; F16D 23/04; F16D 23/06; F16D 2023/0618; F16D 2023/0681; F16D 2023/0693
  See application file for complete search history.

(56) References Cited

U.S. PATENT DOCUMENTS

| | | |
|---|---|---|
| 1,822,107 A | 9/1931 | Murray |
| 4,069,803 A * | 1/1978 | Cataldo .................. F02D 17/02 123/198 F |
| 4,445,602 A | 5/1984 | Chana |
| 5,090,263 A * | 2/1992 | Weyman et al. ....... F16D 23/06 192/53.341 |
| 2005/0241903 A1* | 11/2005 | Rebholz ................. F16D 23/04 192/53.361 |

FOREIGN PATENT DOCUMENTS

JP 8-200397 A * 8/1996 ............. F16D 23/04

OTHER PUBLICATIONS

Title: Automotive Transmissions—Fundamentals, Selection, Design and Application Chapter 9: Gear Shifting Mechanisms, Layout and Design of Synchronisers Authors: G. Lechner; H. Naunheimer Publisher: Springer-Verlag Berlin Heidelberg 1999 ISBN 3-540-65903-X Springer-Verlag Berlin Heidelberg New York.

* cited by examiner

*Primary Examiner* — Richard Lorence
(74) *Attorney, Agent, or Firm* — Volpe and Koenig, P.C.

(57) ABSTRACT

A dual actuation synchronizing clutch assembly including an improved synchronization arrangement is provided. The dual actuation synchronizing clutch assembly has a plurality of operational phases, including initial, synchronization, positioning, engagement, and running phases that vary the torque flow path between the input shaft and output shaft. A synchronizing assembly is provided that includes a synchronizer ring having a first friction surface and synchronizer teeth. A connecting gear includes a lock-up assembly with retractable elements and connecting gear teeth. An output gear includes a second friction surface configured to frictionally engage the first friction surface of the synchronizer ring, and a contoured receiving path with positioning points configured to receive the retractable elements of the lock-up assembly.

18 Claims, 16 Drawing Sheets

DUAL ACTUATION BALL CONTOUR SYNCHRONIZING CLUTCH

FIELD OF INVENTION

The present invention relates to a clutch and is more particularly related to a synchronizer assembly for a clutch.

BACKGROUND

Clutches are provided to connect and disconnect all-wheel drive (AWD) systems through a power transfer unit (PTU) or a rear drive unit (RDU). One known type of clutch is used in an automobile to switch between AWD and two wheel drive (2WD) mode. In these known clutches, it is necessary to synchronize the speeds between an input shaft and output shaft. A variety of synchronization assemblies are provided to synchronize the speeds of the input shaft and output shaft. However, these known synchronization assemblies can cause chatter, clashing, and/or grinding of the synchronizing components, which results in undesirable wear to the clutch components.

It would be desirable to provide a compact assembly that provides a smooth and quiet synchronization arrangement between the input shaft and output shaft.

SUMMARY

An improved synchronization assembly is provided that increases synchronizing efficiency, reduces misalignment between components being synchronized, and prevents wear and damage to these components. The improved synchronization assembly also reduces the distance required for synchronizing components to move between phases, and improves the life cycle of synchronization components, such as the clutch springs and lock-up assembly components.

A dual actuation synchronizing clutch assembly is provided that includes an input shaft and a rotatably supported output shaft axially aligned with the input shaft. A connecting gear includes a lock-up assembly with retractable elements and connecting gear teeth, and the connecting gear is connected to the input shaft. A first actuator is configured to engage a first actuator loading bearing axially against the connecting gear. A synchronizer ring includes a first friction surface and synchronizer teeth. An output gear is fixed to the output shaft, and the output gear includes output gear teeth and a second friction surface configured to frictionally engage the first friction surface of the synchronizer ring. A contoured receiving path of the output gear includes positioning points configured to receive retractable elements of the lock-up assembly. A shifter sleeve includes shifter sleeve teeth that mesh with the connecting gear teeth and the synchronizer teeth, and the shifter sleeve teeth are configured to mesh with the output gear teeth. A second actuator is configured to engage a second actuator loading bearing axially against the shifter sleeve. A first spring is arranged between the synchronizer ring and the output gear, a second spring is arranged between the connecting gear and the synchronizer ring, and a third spring biases the shifter sleeve to a disengaged position. The dual actuation synchronizing clutch assembly has a plurality of operational phases. During an initial phase, the first and second actuators are deactivated, and the first, second, and third springs are in an expanded state such that the input shaft and the output shaft are rotatable independently from each other. During a synchronization phase, the first actuator is in a first actuation mode, the first spring and the second spring are at least partially compressed, and the first friction surface of the synchronizer ring engages the second friction surface of the output gear. During the synchronization phase, a torque flow path is provided between the input shaft and the output shaft via the first and second friction surfaces of the synchronizer ring and the output gear. During a positioning phase, the first actuator is in a second actuation mode, and at least the second spring is further compressed than in the synchronization phase, the retractable elements of the lock-up assembly engage in the positioning points of the contoured receiving path of the output gear, and the first friction surface of the synchronizer ring remains engaged with the second friction surface of the output gear. During the positioning phase, the torque flow path is at least partially provided between the input shaft and the output shaft via the lock-up assembly of the connecting gear engaging the output gear, and the shifter sleeve teeth are aligned with the output gear teeth. During an engagement phase, the first actuator is in the second actuation mode and the second actuator is actuated, the third spring is at least partially compressed, the retractable elements of the lock-up assembly remain engaged in the positioning points of the contoured receiving path of the output gear, and the shifter sleeve teeth engage the output gear teeth. During the engagement phase, the torque flow path is provided between the input shaft and the output shaft via the output gear teeth and the shifter sleeve teeth. During a running phase, the first actuator is deactivated and the second actuator remains actuated, and the first spring and the second spring return to an expanded state and the third spring remains at least partially compressed, so that the first friction surface of the synchronizer ring is disengaged from the second friction surface of the output gear, the retractable elements of the lock-up assembly disengage from the positioning points of the contoured receiving path of the output gear, and the shifter sleeve teeth remain engaged with the shifter sleeve teeth. During the running phase, the torque flow path is provided between the input shaft and the output shaft via the output gear teeth and the shifter sleeve teeth.

BRIEF DESCRIPTION OF THE DRAWINGS

The foregoing Summary and the following detailed description will be better understood when read in conjunction with the appended drawings, which illustrate a preferred embodiment of the invention. In the drawings.

DETAILED DESCRIPTION OF THE PREFERRED EMBODIMENTS

Figure 1:
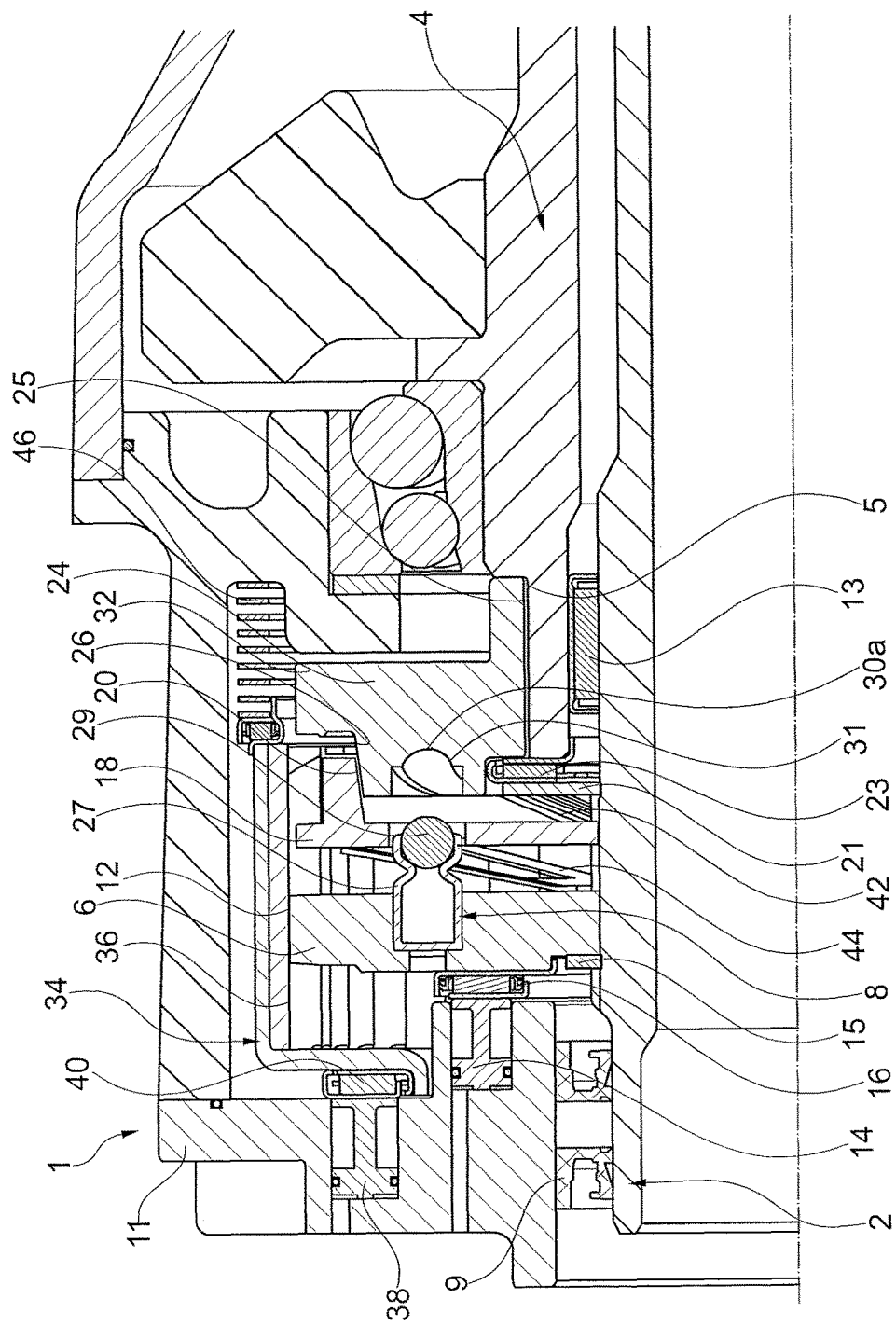
FIG. 1 is a cross sectional view of a dual actuation synchronizing clutch assembly according to a first embodiment of the invention.

Certain terminology is used in the following description for convenience only and is not limiting. The words "front," "rear," "upper," and "lower" designate directions in the drawings to which reference is made. The words "inwardly" and "outwardly" refer to directions toward and away from the parts referenced in the drawings. "Axially" refers to a direction along the axis of a shaft or rotating part. A reference to a list of items that are cited as "at least one of a, b, or c" (where a, b, and c represent the items being listed) means any single one of the items a, b, or c, or combinations thereof. The terminology includes the words specifically noted above, derivatives thereof and words of similar import.

As shown in FIGS. 1, 2, and 4A-4E, a dual actuation synchronizing clutch assembly 1 is provided. The dual actuation synchronizing clutch assembly 1 includes an input shaft 2 and a rotatably supported output shaft 4 axially aligned with the input shaft 2. Preferably, a shaft support bearing 13 is provided between the input shaft 2 and the output shaft 4. The input shaft 2 preferably includes input shaft splines 3. As shown in FIG. 1, at least one shaft seal 9 is provided between the input shaft 2 and a housing 11. The dual action synchronizing clutch assembly 1 includes a connecting gear 6 that has a lock-up assembly 8 with retractable elements 10 and connecting gear teeth 12, and the connecting gear 6 is connected rotationally fixed to the input shaft 2. The connecting gear 6 preferably includes connecting gear splines 7 meshed with the input shaft splines 3. The output gear 24 includes output gear splines 25 that mesh with the output shaft 4 via output shaft splines 5. A snap ring 15 preferably engages the input shaft 2 and axially positions the connecting gear 6 with respect to the input shaft 2.

Figure 2:
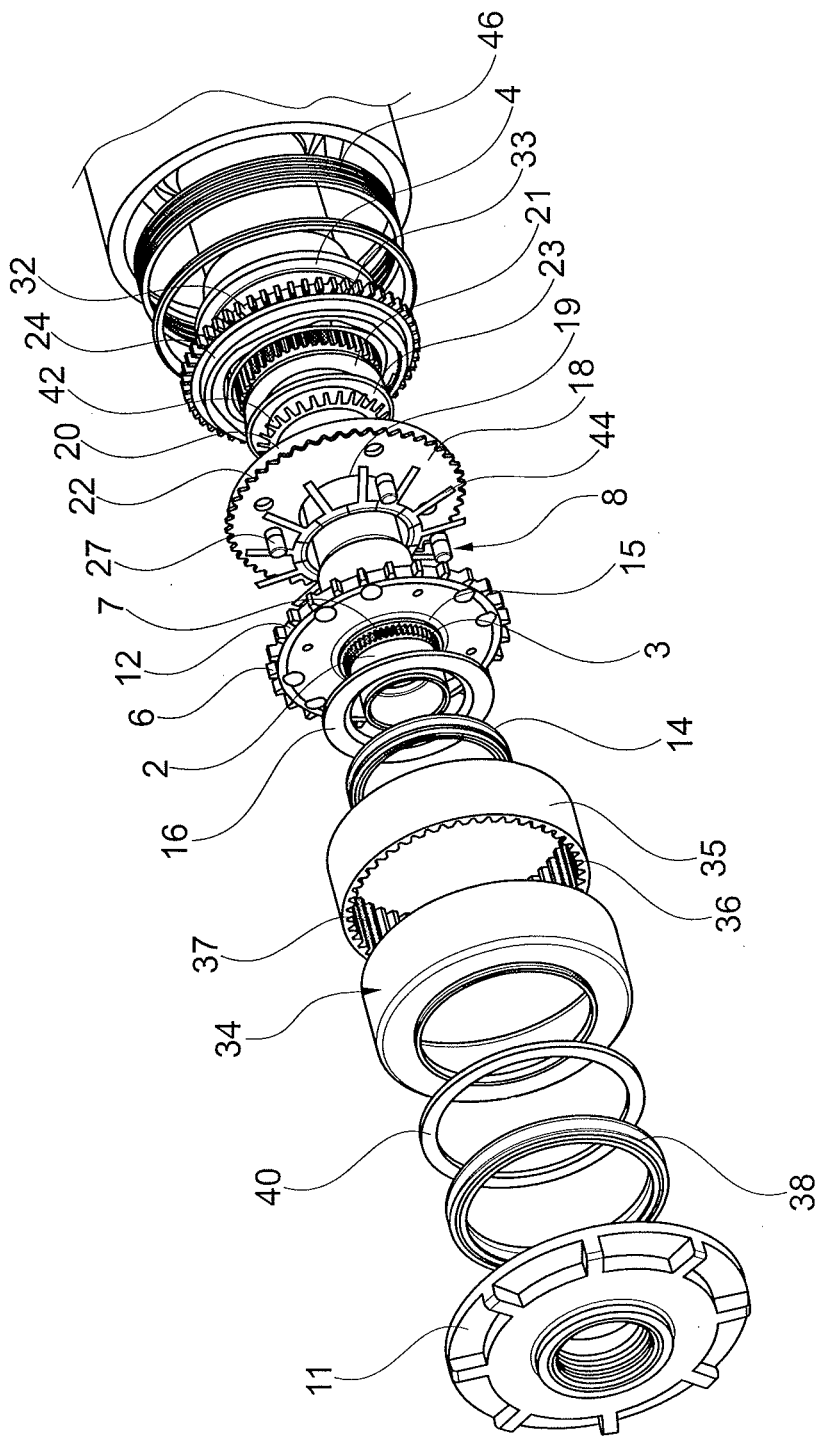
FIG. 2 is an exploded view of the dual actuation synchronizing clutch assembly of FIG. 1.

A first actuator 14 configured as a hydraulically actuated annular piston engages a first actuator loading bearing 16 axially against the connecting gear 6. A synchronizer ring 18 includes a first friction surface 20 and synchronizer teeth 22. An output gear 24 is fixed to the output shaft 4, and the output gear 24 includes a second friction surface 26 configured to be frictionally engaged by the first friction surface 20 of the synchronizer ring 18. The first friction surface 20 of the synchronizer ring 18 and the second friction surface 26 of the output gear 24 each preferably have a frusto-conical profile. As shown in FIG. 2, the synchronizer ring 18 includes synchronizer ring splines 19 that mate with the input shaft splines 3.

Figure 3:
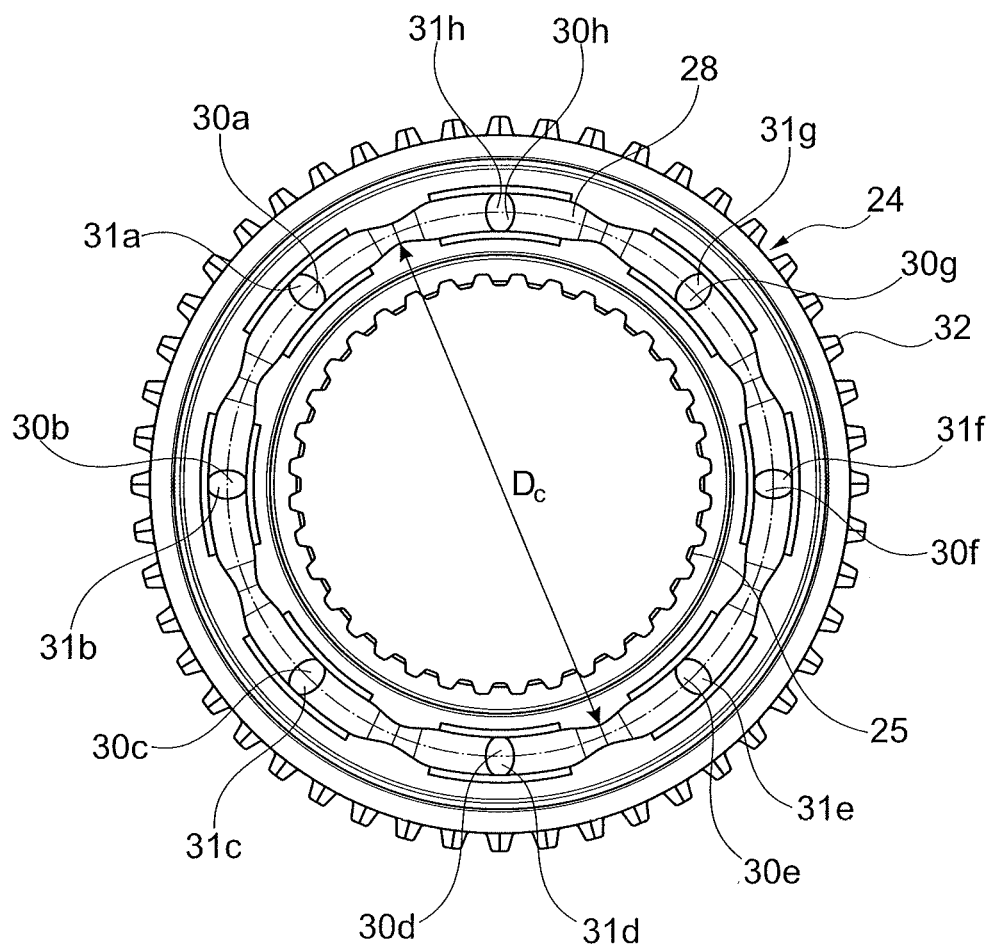
FIG. 3 is an axial view of an output gear of the dual actuation synchronizing clutch assembly of FIGS. 1 and 2.

As shown in FIG. 3, the output gear 24 includes a contoured receiving path 28 with positioning points 30a-30h each configured to receive the retractable elements 10 of the lock-up assembly 8. Although the output gear 24 is shown with eight positioning points 30a-30h in the Figures, one of ordinary skill in the art will recognize that any number of positioning points can be used. The output gear 24 also includes output gear teeth 32, which are provided for driving engagement with shifter sleeve 34, described below. As shown in FIGS. 1 and 2, a thrust washer 21 and a thrust bearing 23 are provided between the synchronizer ring 18 and the output shaft 4 and the output gear 24.

The lock-up assembly 8 preferably includes a plurality of cups 27 each having a ball 29, and the positioning points 30a-30h of the contoured receiving path 28 of the output gear 24 include pockets 31a-31h to receive the balls 29. Preferably, the lock-up assembly 8 includes three cups 27 and balls 29. One of ordinary skill in the art would recognize that the number of cups 27 and balls 29, as well as the arrangement of the cups 27 and balls 29, can be varied.

A shifter sleeve 34 includes a shifter ring 35 with shifter sleeve teeth 36 that mesh with the connecting gear teeth 12 and the synchronizer teeth 22. The shifter sleeve teeth 36 are also configured to mesh with the output gear teeth 32. The output gear teeth 32 are preferably arranged on a radially outer surface 33 of the output gear 24, and the shifter sleeve teeth 36 are preferably arranged on a radially inner surface 37 of the shifter ring 35. A second actuator 38, preferably configured as a hydraulically actuated annular piston, engages a second actuator loading bearing 40 axially against the shifter sleeve 34. The first and second actuators 14, 38 are preferably hydraulic actuators, however one of ordinary skill in the art would recognize that other types of actuators can be used, such as magnetic or mechanical actuators. A first spring 42 is arranged between the synchronizer ring 18 and the output gear 24. A second spring 44 is arranged between the connecting gear 6 and the synchronizer ring 18. A third spring 46 biases the shifter sleeve 34 to a disengaged position.

Figure 3A:
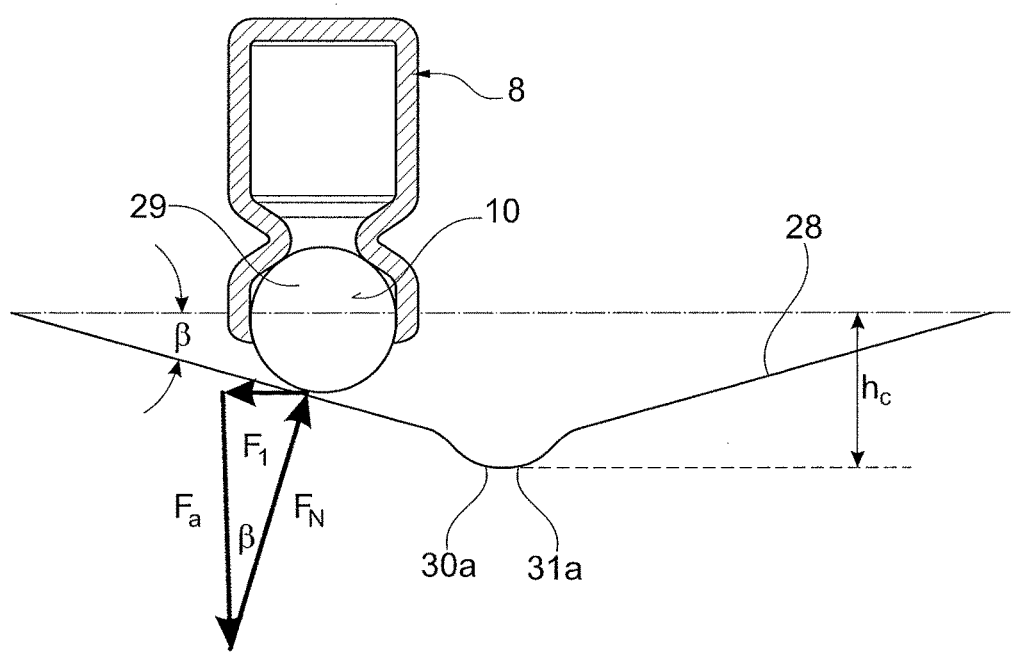
FIG. 3A is a schematic view of a first embodiment of a contoured profile of the output gear of FIG. 3.
Figure 3B:
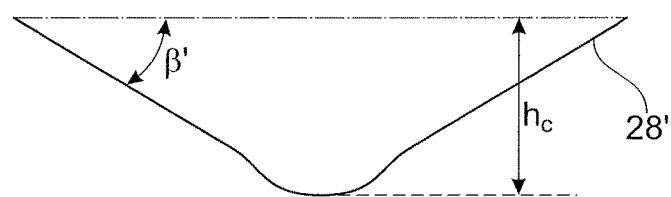
FIG. 3B is a schematic view of a second embodiment of a contoured profile of the output gear of FIG. 3.

A schematic view of a section of the profile of the contours of the contoured receiving path 28 of the output gear 24 is shown in FIGS. 3A and 3B. The contoured receiving path 28 is formed as an annular groove or recess and has a contour slope angle ($\beta$), a contour diameter ($D_c$) shown in FIG. 3, and a contour height ($h_c$). The following relationships are provided for the arrangement and design of the lock-up assembly 8:

$$F_t = F_a * \tan(\beta)$$

$$T_r = 0.5n * F_t * D_c = 0.5n * F_a * D_c * \tan(\beta)$$

$$F_a = 2T_r / [n * D_c * \tan(\beta)]$$

$$F_r = n * F_a = 2T_r / [D_c * \tan(\beta)]$$

wherein ($F_t$) corresponds to a required position force, (Tr) corresponds to a torque required for rotating the output gear 24, (n) corresponds to a number of retractable elements 10. FIG. 3A corresponds to a first embodiment of the contoured receiving path 28 including one set of contours, and FIG. 3B corresponds to a second embodiment of the contoured receiving path 28' including two sets of contours. The contour slope angle ($\beta'$) of FIG. 3B is approximately two times of the contour slope angle ($\beta$) of FIG. 3A. ($F_N$) corresponds to a normal force of the retractable element 10 on the contoured receiving path 28, and ($F_t$) corresponds to a traction force experienced by the retractable elements 10 along the contoured receiving path 28.

The dual actuation synchronizing clutch assembly 1 has a plurality of operational phases, shown in FIGS. 4A-4E. The use of these phases helps reduce the wear on the retractable elements 10, and the springs 42, 44, 46, as well as helps reduce the lag time between switching from a running phase, during which the input shaft 2 and output shaft 4 are connected, to an initial phase, during which the input shaft 2 and the output shaft 4 are disconnected.

Figure 4A:
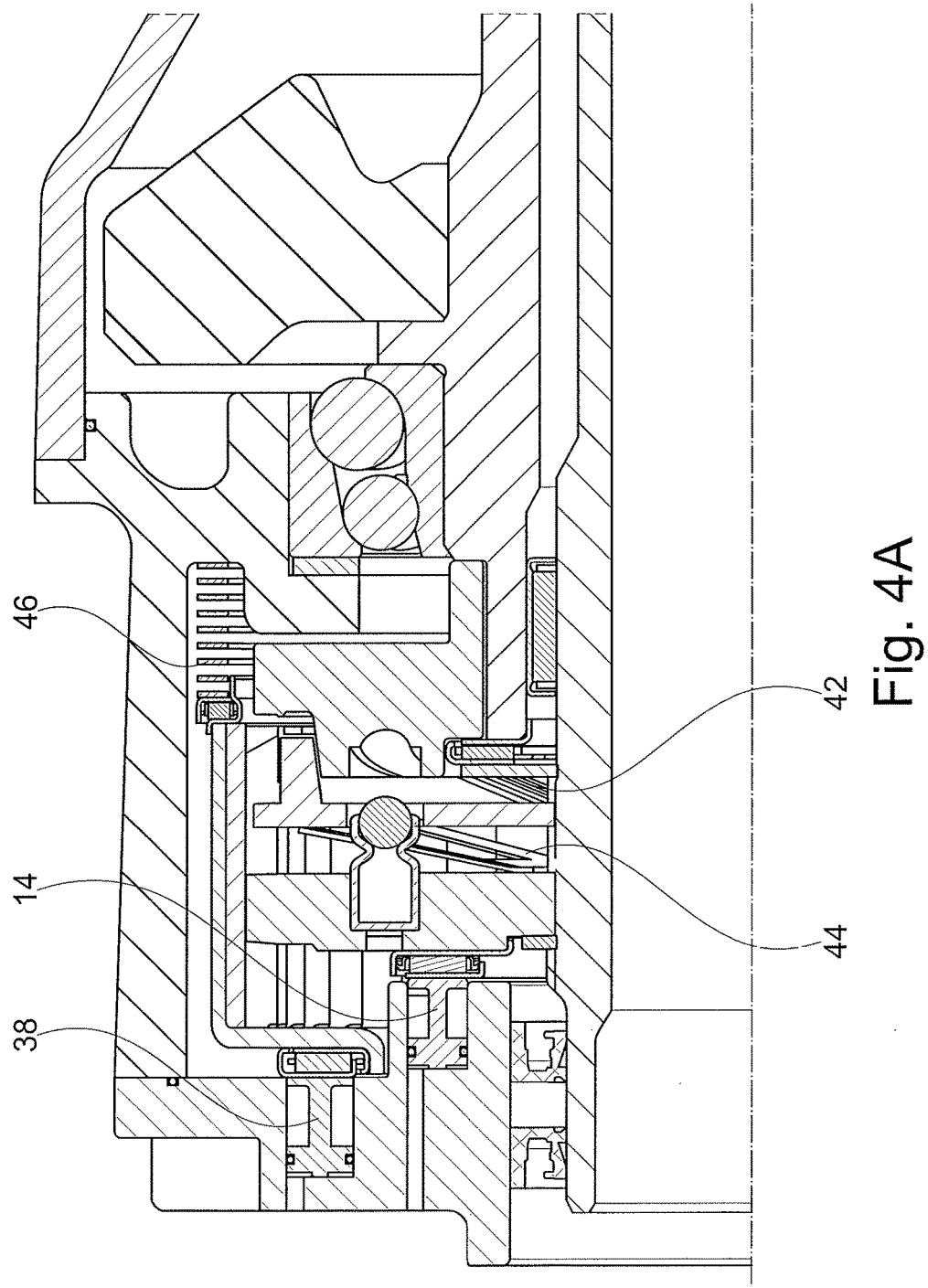
FIG. 4A is a cross sectional view of the dual actuation synchronizing clutch assembly of FIGS. 1 and 2 in an initial phase.
Figure 7A:
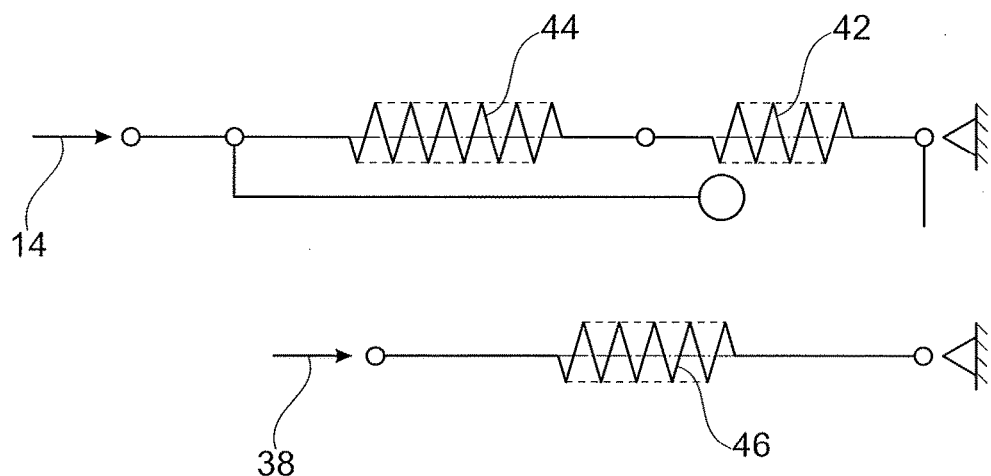
FIG. 7A is a schematic view of the actuators and springs of the dual actuation synchronizing clutch assembly in an initial phase.

In an initial phase, shown in FIGS. 4A and 7A, the first actuator 14 and the second actuator 38 are deactivated, and the first spring 42, the second spring 44, and the third spring 46 are in an expanded state such that the input shaft 2 and the output shaft 4 are rotatable independently from each other.

Figure 4B:
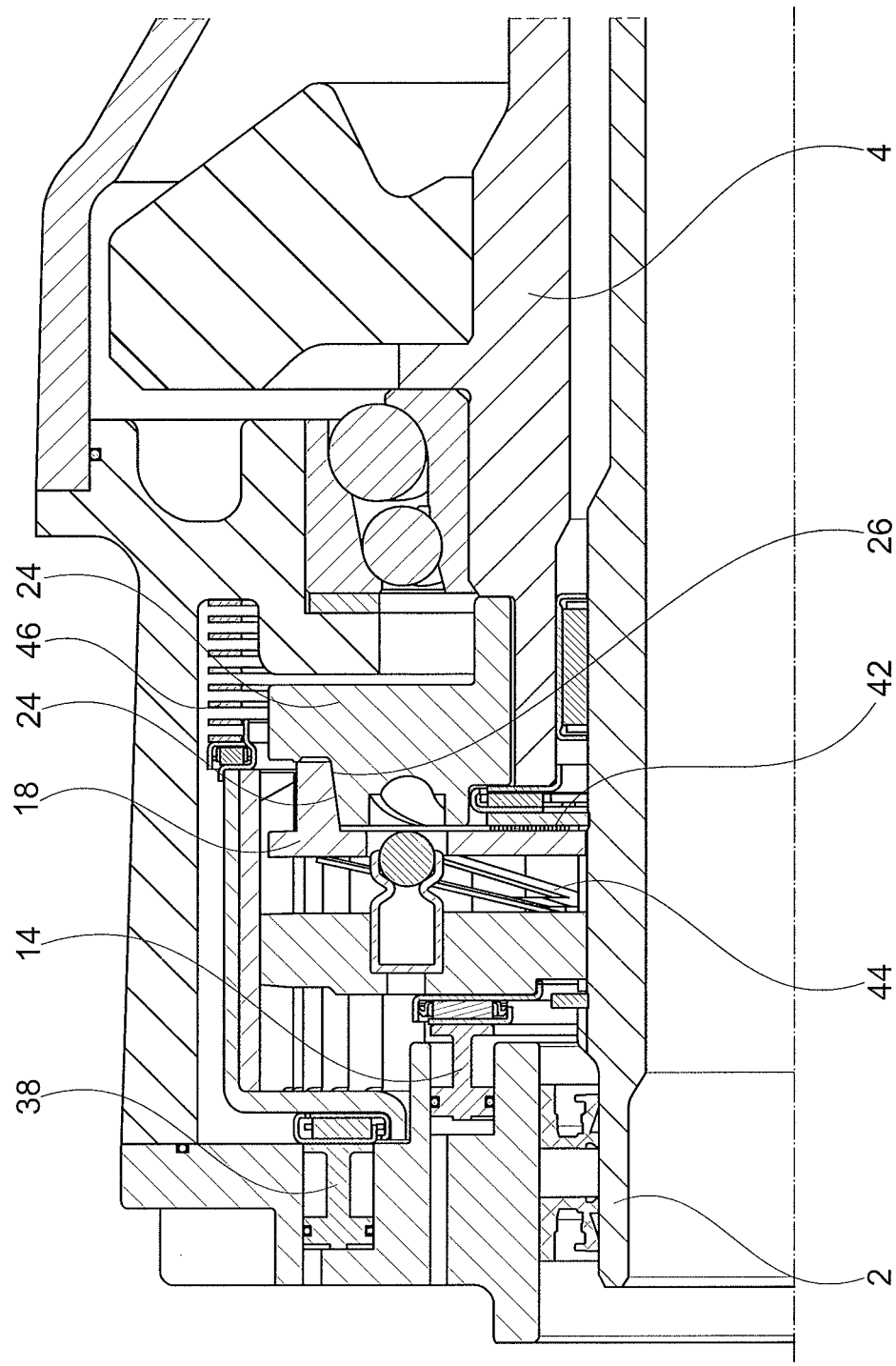
FIG. 4B is a cross sectional view of the dual actuation synchronizing clutch assembly of FIGS. 1 and 2 in a synchronization phase.
Figure 7B:
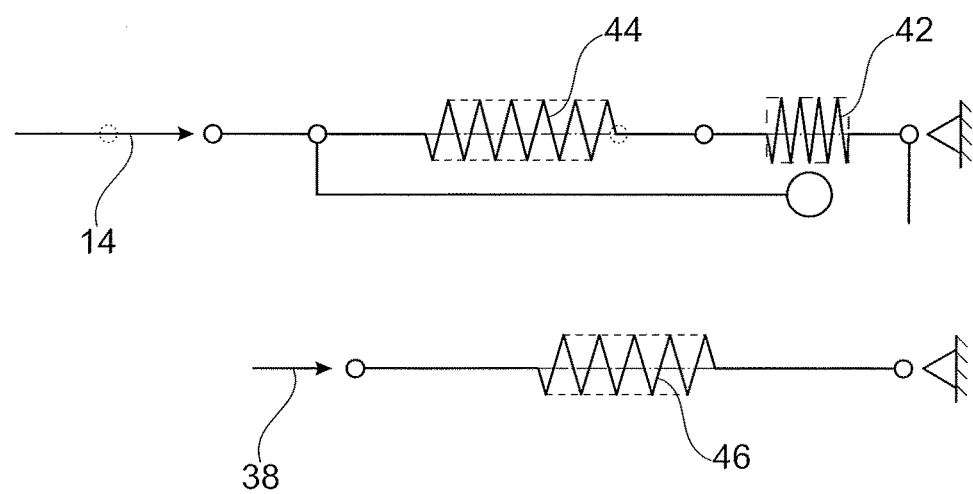
FIG. 7B is a schematic view of the actuators and springs of the dual actuation synchronizing clutch assembly in a synchronization phase.

In a synchronization phase, shown in FIGS. 4B and 7B, the first actuator 14 is in a first actuation mode. The second actuator 38 remains deactivated in this phase. The first spring 42 and the second spring 44 are at least partially compressed with the first spring 42 preferably being compressed to a maximum compression state, and the first friction surface 20 of the synchronizer ring 18 engages the second friction surface 26 of the output gear 24, and a torque flow path is provided between the input shaft 2 and the output shaft 4 via the first and second friction surfaces 20, 26 of the synchronizer ring 18 and the output gear 24.

Figure 4C:
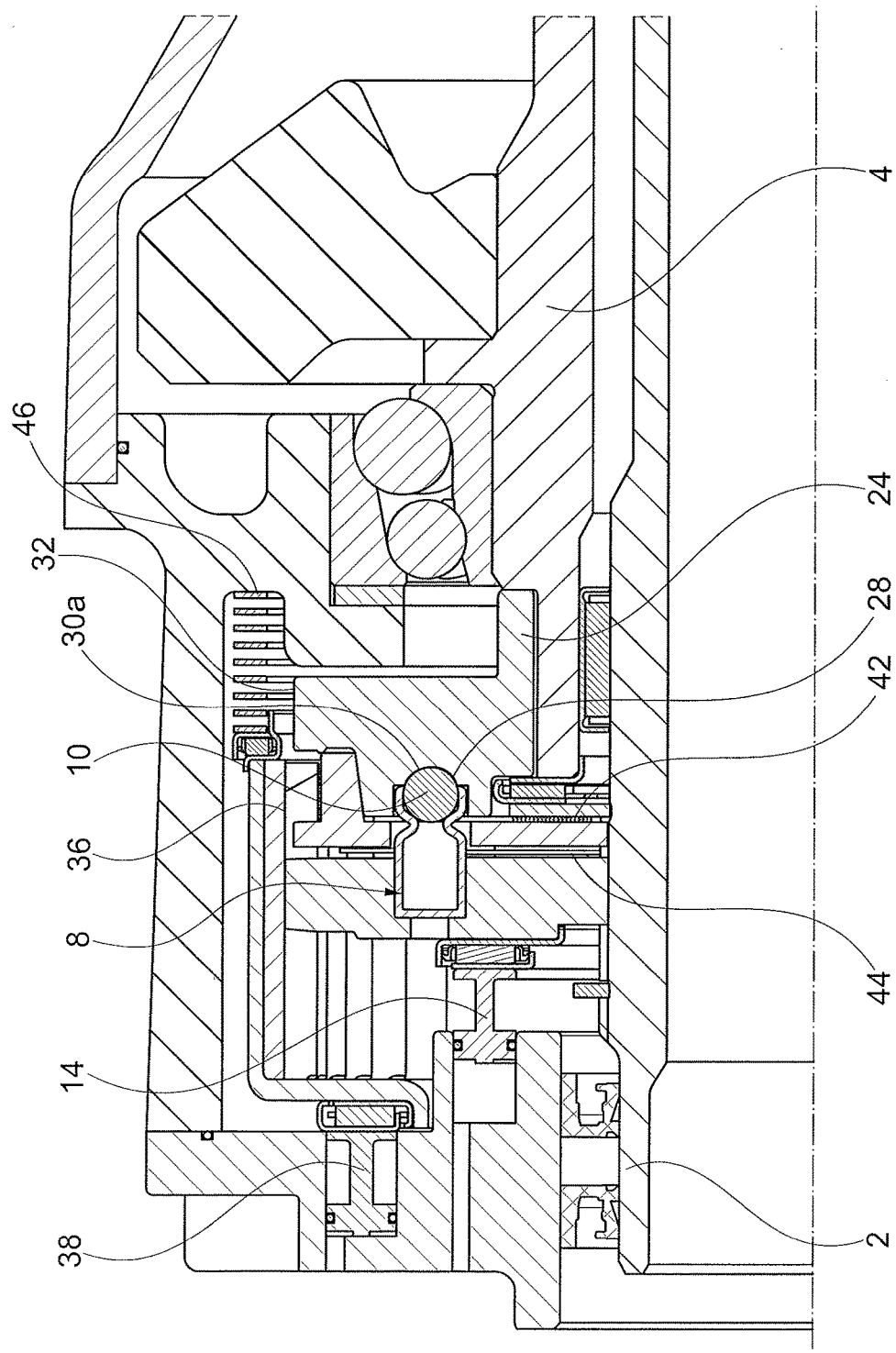
FIG. 4C is a cross sectional view of the dual actuation synchronizing clutch assembly of FIGS. 1 and 2 in a positioning phase.
Figure 7C:
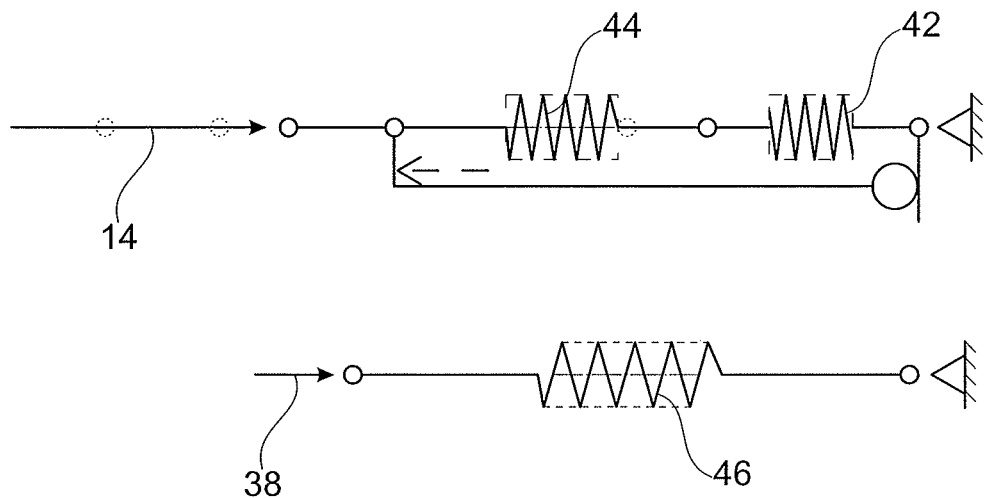
FIG. 7C is a schematic view of the actuators and springs of the dual actuation synchronizing clutch assembly in a positioning phase.

In a positioning phase, shown in FIGS. 4C and 7C, the first actuator 14 is in a second actuation mode. The second actuator 38 remains deactivated in this phase. In this phase, at least the second spring 44 is further compressed than in the synchronization phase. The retractable elements 10 of the lock-up assembly 8 engage in at least some of the positioning points 30a-30h of the contoured receiving path 28 of the output gear 24, and the first friction surface 20 of the synchronizer ring 18 remains engaged with the second friction surface 26 of the output gear 24. The torque flow path is at least partially provided between the input shaft 2 and the output shaft 4 via the lock-up assembly 8 of the connecting gear 6 engaging the output gear 24. Here, the shifter sleeve teeth 36 are aligned with the output gear teeth 32 via the balls 29 being located in the position points 30a-30h.

Figure 4D:
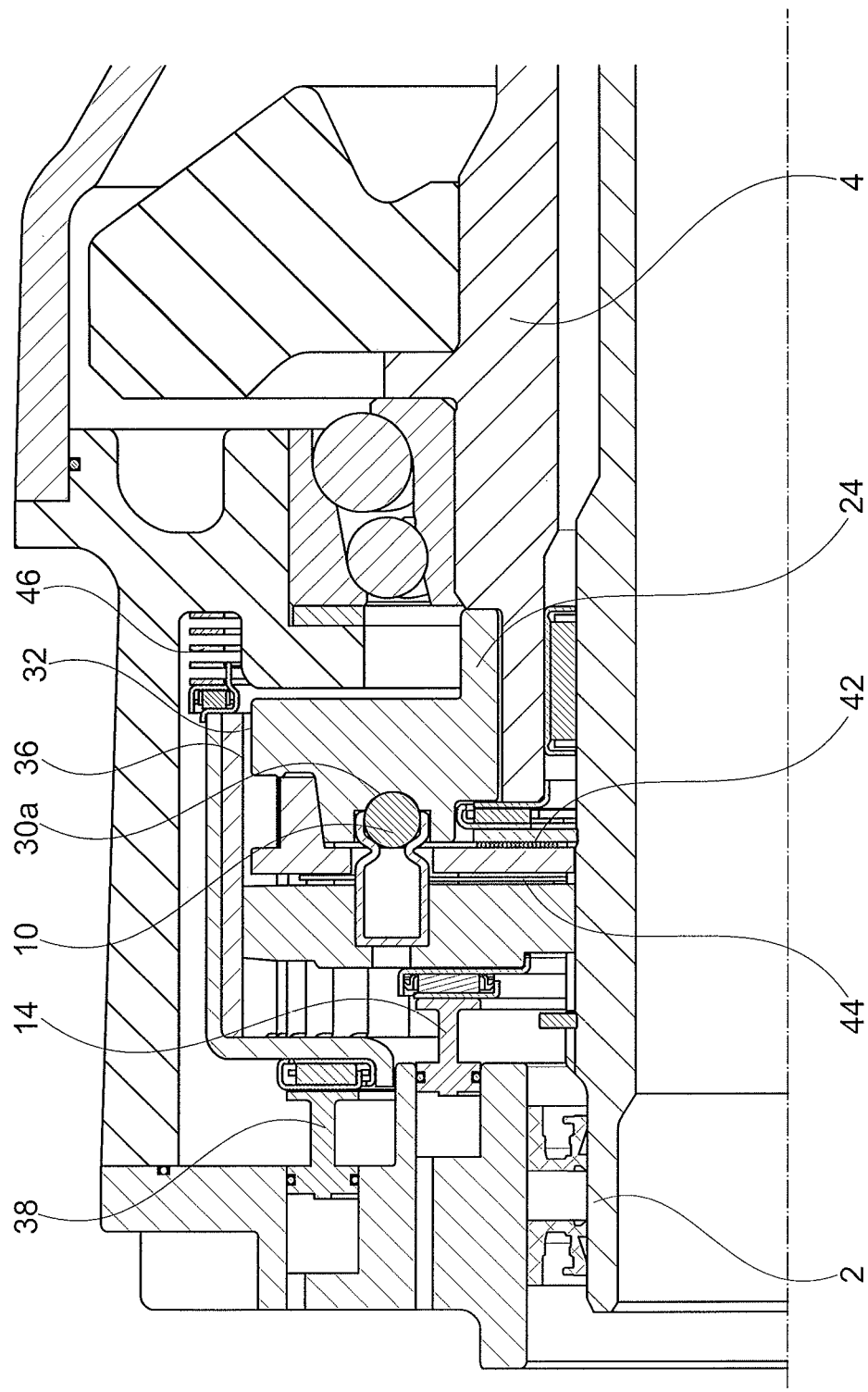
FIG. 4D is a cross sectional view of the dual actuation synchronizing clutch assembly of FIGS. 1 and 2 in an engagement phase.
Figure 7D:
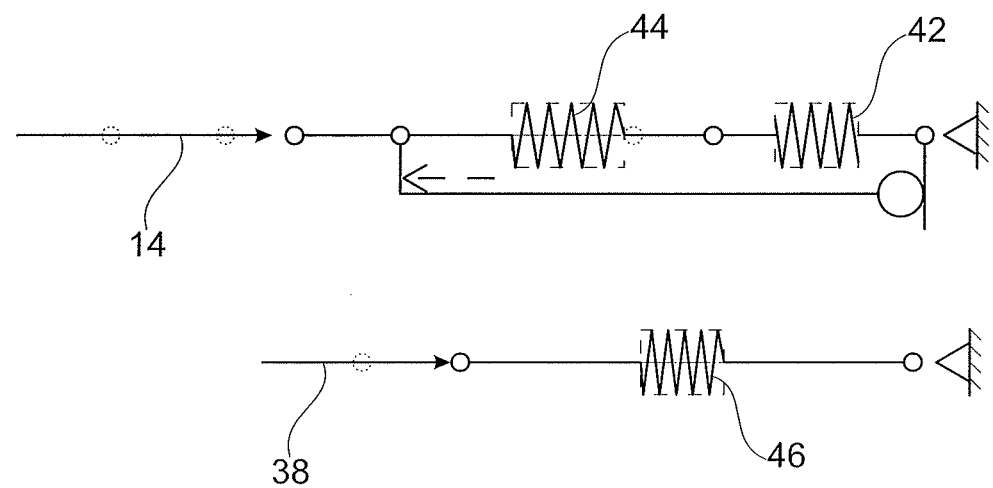
FIG. 7D is a schematic view of the actuators and springs of the dual actuation synchronizing clutch assembly in an engagement phase.

In an engagement phase, shown in FIGS. 4D and 7D, the first actuator 14 is in the second actuation mode and the second actuator 38 is actuated. The third spring 46 is at least partially compressed due to the force from the second actuator 38. The retractable elements 10 of the lock-up assembly 8 remain engaged in the positioning points 30a-30h of the contoured receiving path 28 of the output gear 24, and the output gear teeth 32 engage the shifter sleeve teeth 36, such that the torque flow path is provided between the input shaft 2 and the output shaft 4 via the shifter sleeve teeth 36 engaging the output gear teeth 32.

Figure 4E:
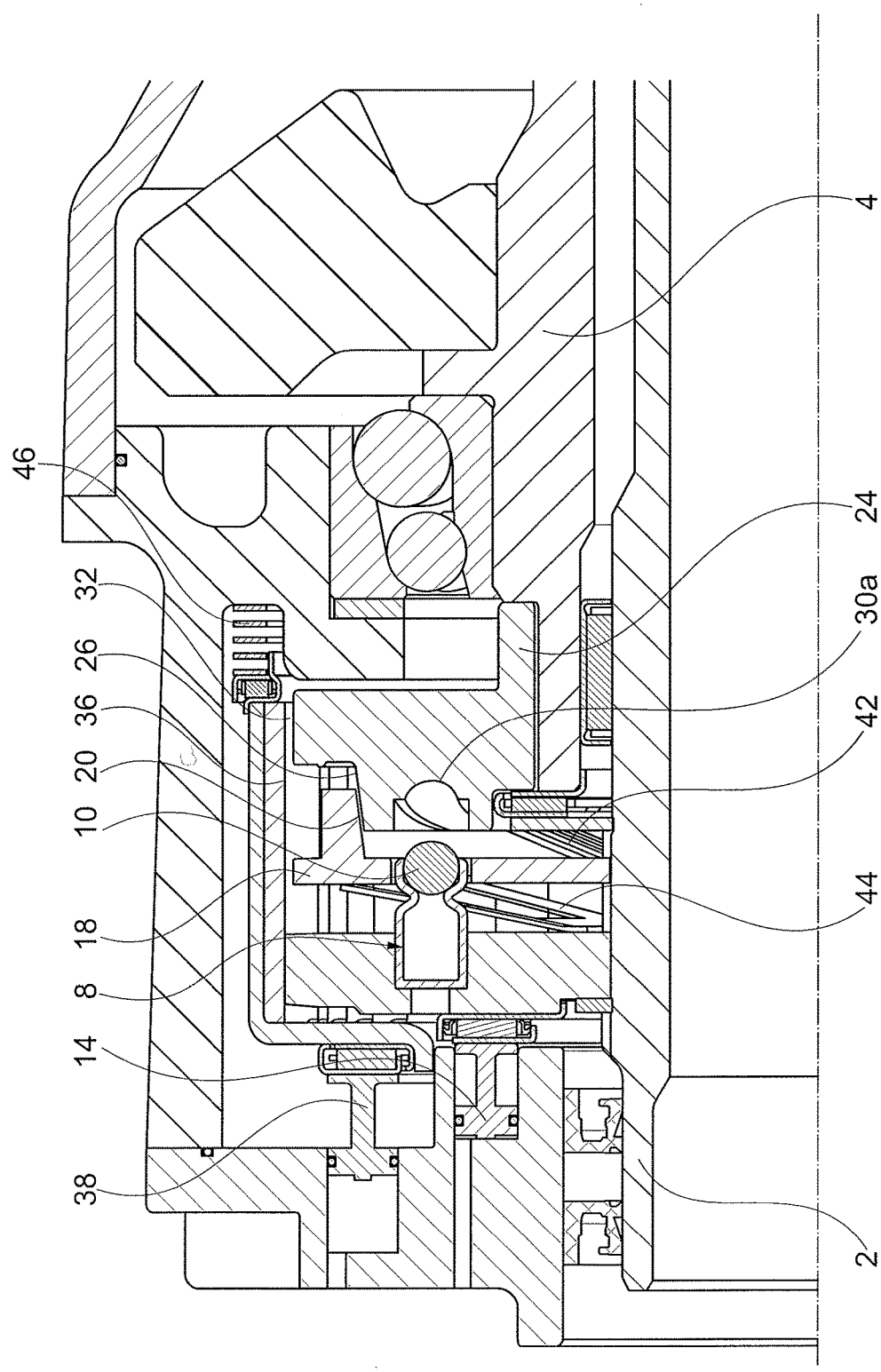
FIG. 4E is a cross sectional view of the dual actuation synchronizing clutch assembly of FIGS. 1 and 2 in a running phase.
Figure 7E:
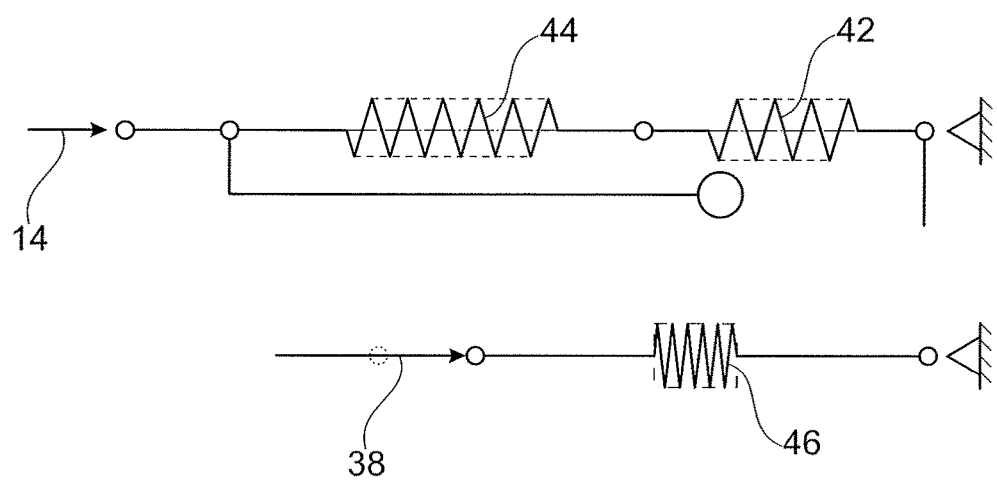
FIG. 7E is a schematic view of the actuators and springs of the dual actuation synchronizing clutch assembly in a running phase.

In a running phase, shown in FIGS. 4E and 7E, the first actuator 14 is deactivated and the second actuator 38 remains actuated. The first spring 42 and the second spring 44 return to an expanded state and the third spring 46 remains at least partially compressed. The first friction surface 20 of the synchronizer ring 18 is disengaged from the second friction surface 26 of the output gear 24. The retractable elements 10 of the lock-up assembly 8 are disengaged from the positioning points 30a-30h of the contoured receiving path 28 of the output gear 24. The shifter sleeve teeth 36 remain engaged with the output gear teeth 32, such that the torque flow path is provided between the input shaft 2 and the output shaft 4 via the shifter sleeve teeth 36 and the output gear teeth 32.

To disengage the output gear teeth 32 from the shifter sleeve teeth 36, the second actuator 38 is deactivated, and the third spring 46 axially biases the shifter sleeve 34. This axial movement of the shift sleeve 34 causes the output gear teeth 32 to disengage the shifter sleeve teeth 36, eliminating the torque flow path between the input shaft 2 and the output shaft 4. The shift sleeve 34 only needs to axially move slightly more than a tooth width of the output gear teeth 32. This provides a much shorter shifting distance than known synchronizer arrangements, and as a result the third spring 46 can have a lower stiffness and the second actuator 38 does not need to be as strong as the prior art.

Figure 5A:
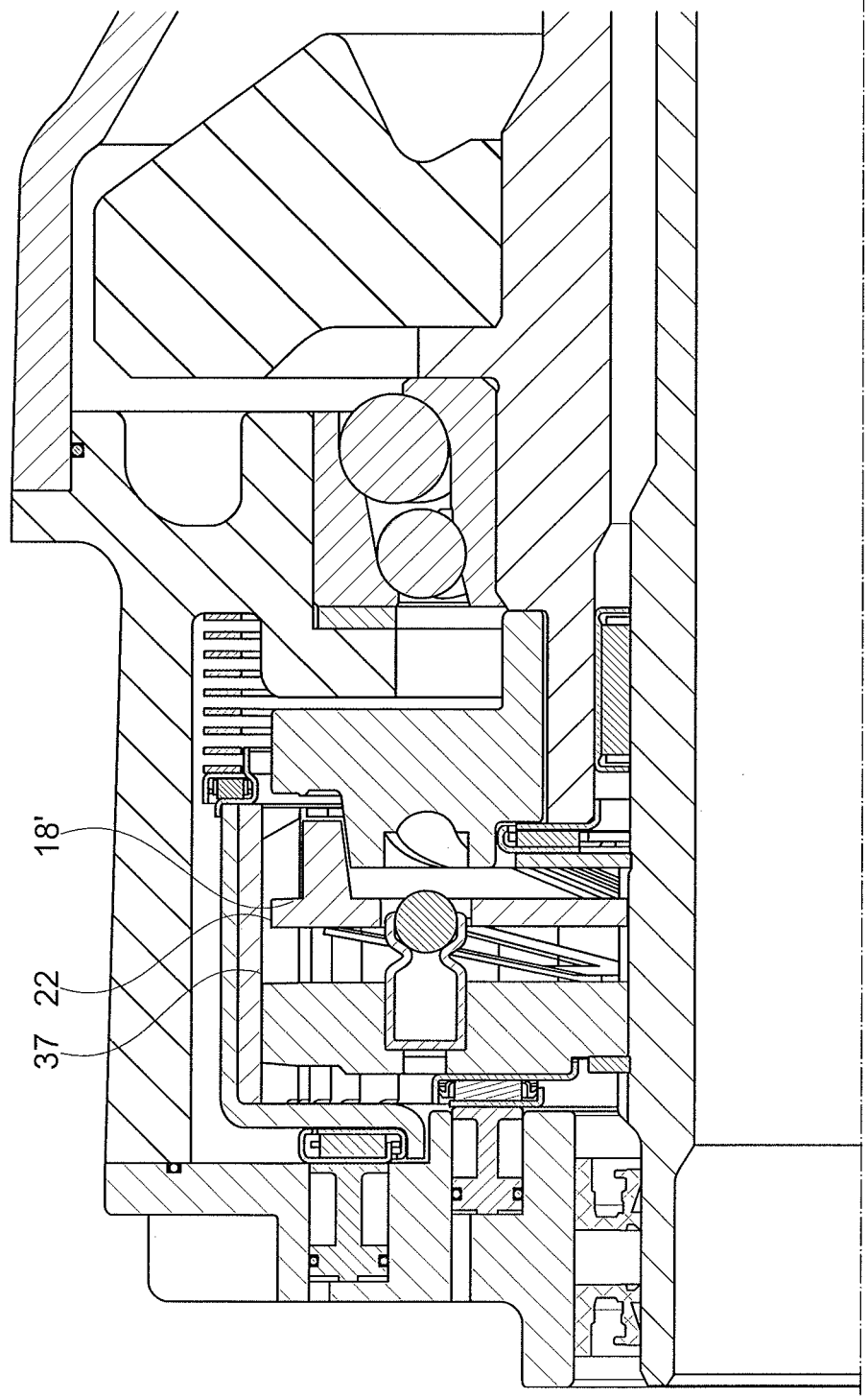
FIG. 5A is a cross sectional view of an alternative embodiment of a synchronizer ring for the dual actuation synchronizing clutch assembly.

FIG. 5A shows an alternative embodiment of the synchronizer ring 18', which lacks synchronizer ring splines 19 for mating with the input shaft splines 3. In this embodiment, the rotational motion from the input shaft 2 is provided from the shifter sleeve teeth 36 of the shifter ring 35 to the synchronizer teeth 22 of the synchronizer ring 18'

Figure 5B:
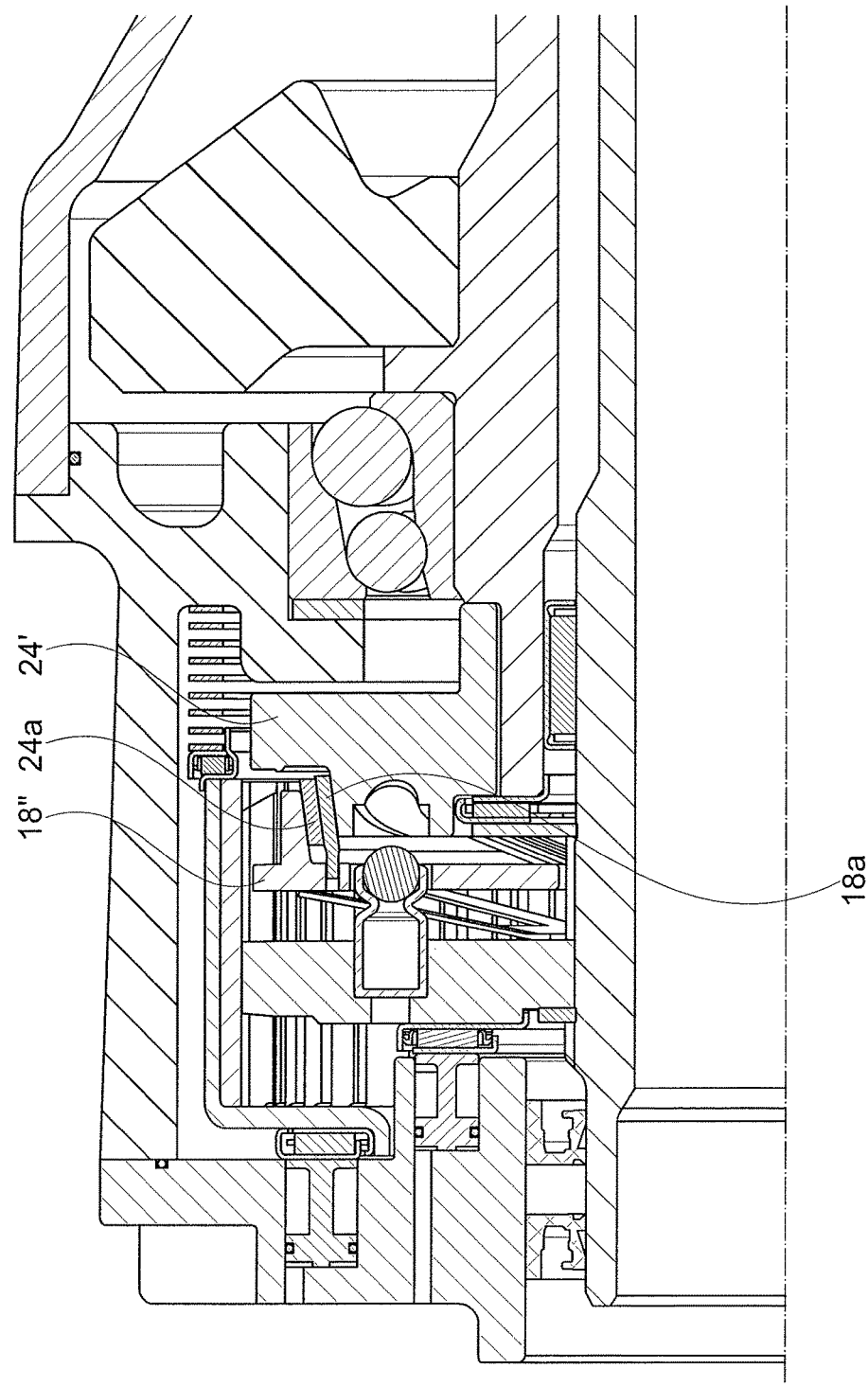
FIG. 5B is a cross sectional view of an alternative embodiment of friction surfaces for the synchronizing ring and the output gear of the dual actuation synchronizing clutch assembly.

FIG. 5B shows an alternative embodiment of the friction surfaces of the synchronizer ring 18" and the output gear 24'. In the embodiment shown in FIG. 5B, a first cone 18a is provided for the synchronizer ring 18" and a second cone 24a is provided for the output gear 24'. These cones 18a, 24a provide additional contact surface area between the synchronizer ring 18" and the output gear 24' to improve the transfer of torque between these components. One of ordinary skill in the art would recognize that additional cones can be used and alternative arrangements of the cones can be used, depending on spatial requirements, to increase the torque transfer.

Figure 6A:
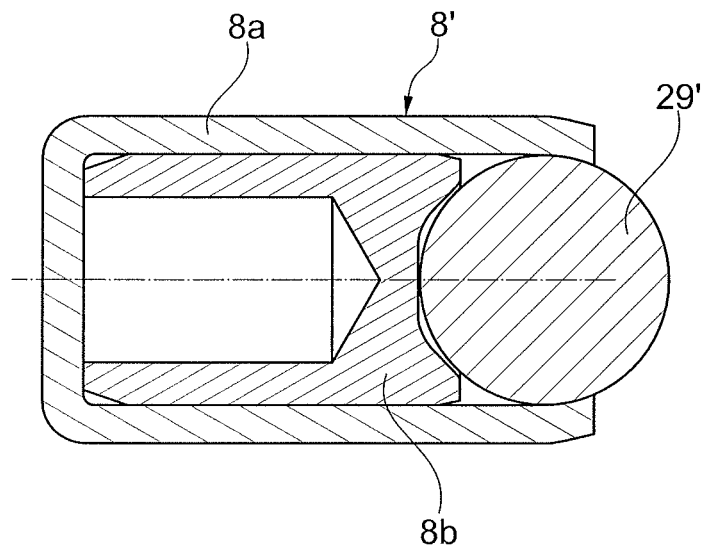
FIG. 6A is an enlarged cross sectional view of a lock-up assembly for the dual actuation synchronizing clutch assembly.
Figure 6B:
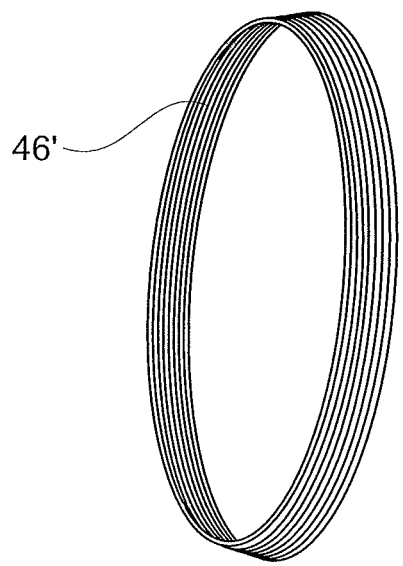
FIG. 6B is a perspective view of an alternative embodiment of a third spring of the dual actuation synchronizing clutch assembly.

FIG. 6A shows an alternative embodiment of the lock-up assembly 8', including a cup 8a, a ball 29', and a ball support 8b. This embodiment provides a simple arrangement since the cup 8a is deep drawn. FIG. 6B shows an alternative embodiment of the third spring 46'. The third spring 46' of FIG. 6B is a cone-shape coil spring. One of ordinary skill in the art would recognize that alternative arrangements of the first, second, and/or third springs can be used as long as the stiffness and shifting distance requirements are met.

Figure 8A:
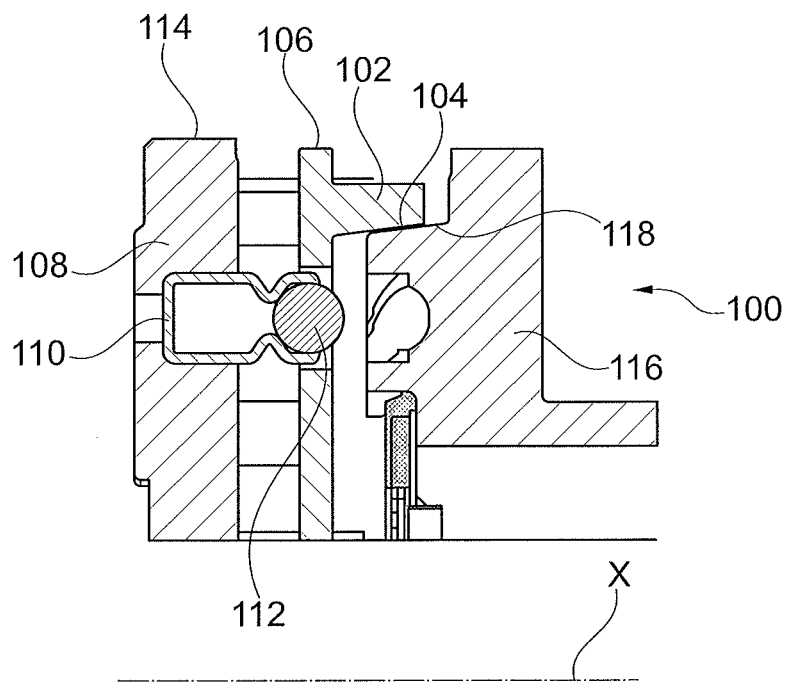
FIG. 8A is a cross sectional view of a synchronizing assembly for a clutch assembly.
Figure 8B:
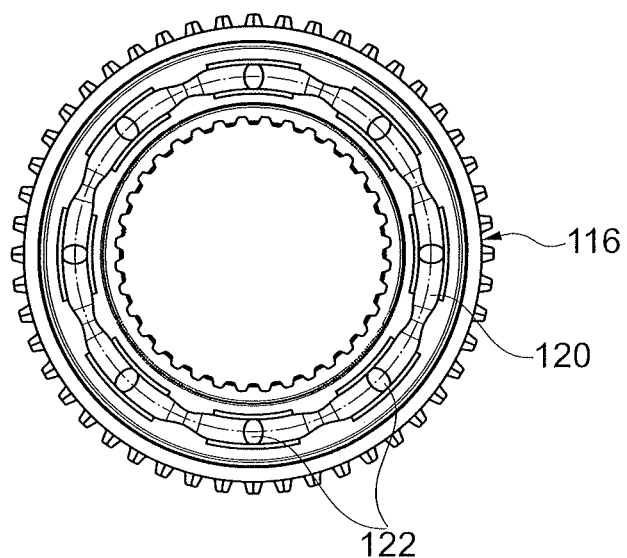
FIG. 8B is an axial view of an output gear for the synchronizing assembly of FIG. 8A.

As shown in FIGS. 8A and 8B, a synchronizing assembly 100 for a clutch is provided. The synchronizing assembly 100 includes a synchronizer ring 102 including a first friction surface 104 and synchronizer teeth 106. A connecting gear 108 includes a lock-up assembly 110 with retractable elements 112, and connecting gear teeth 114. An output gear 116 includes a second friction surface 118 configured to frictionally engage the first friction surface 104 of the synchronizer ring 102. The output gear 116 includes a contoured receiving path 120 with positioning points 122 is configured to receive the retractable elements 112 of the lock-up assembly 110. Actuation of the connecting gear 108 would result in the retractable elements 112 engaging the contoured receiving path 120 with the balls 29 engaged in the positioning points of the path 120 to synchronize the connecting gear 108, and an associated drive shaft, with the output gear 116, and an associated output shaft.

Having thus described the present invention in detail, it is to be appreciated and will be apparent to those skilled in the art that many physical changes, only a few of which are exemplified in the detailed description of the invention, could be made without altering the inventive concepts and principles embodied therein. It is also to be appreciated that numerous embodiments incorporating only part of the preferred embodiment are possible which do not alter, with respect to those parts, the inventive concepts and principles embodied therein. The present embodiment and optional configurations are therefore to be considered in all respects as exemplary and/or illustrative and not restrictive, the scope of the invention being indicated by the appended claims rather than by the foregoing description, and all alternate embodiments and changes to this embodiment which come within the meaning and range of equivalency of said claims are therefore to be embraced therein.

What is claimed is:

1. A dual actuation synchronizing clutch assembly comprising:
   an input shaft;
   a rotatably supported output shaft axially aligned with the input shaft;
   a connecting gear including a lock-up assembly with retractable elements, connecting gear teeth, and the connecting gear is connected to the input shaft;
   a first actuator configured to engage a first actuator loading bearing axially against the connecting gear;
   a synchronizer ring including a first friction surface and synchronizer teeth;
   an output gear fixed to the output shaft, the output gear including a second friction surface configured to frictionally engage the first friction surface of the synchronizer ring, a contoured receiving path with positioning points configured to receive the retractable elements of the lock-up assembly, and output gear teeth;
   a shifter sleeve including shifter sleeve teeth that mesh with the connecting gear teeth and the synchronizer teeth, and the shifter sleeve teeth are configured to mesh with the output gear teeth;
   a second actuator configured to engage a second actuator loading bearing axially against the shifter sleeve;
   a first spring arranged between the synchronizer ring and the output gear, a second spring arranged between the connecting gear and the synchronizer ring, and a third spring that biases the shifter sleeve to a disengaged position;
   the dual actuation synchronizing clutch assembly having a plurality of operational phases, the plurality of operational phases including:
   (1) an initial phase in which the first and second actuators are deactivated, and the first, second, and third springs are in an expanded state such that the input shaft and the output shaft are rotatable independently from each other;
   (2) a synchronization phase in which the first actuator is in a first actuation mode, the first spring and the second spring are at least partially compressed, and the first friction surface of the synchronizer ring engages the second friction surface of the output gear, and a torque flow path is provided between the input shaft and the output shaft via the first and second friction surfaces of the synchronizer ring and the output gear;
   (3) a positioning phase in which the first actuator is in a second actuation mode, and at least the second spring is further compressed than in the synchronization phase, the retractable elements of the lock-up assembly engage in the positioning points of the contoured receiving path of the output gear and the first friction surface of the synchronizer ring remains engaged with the second friction surface of the output gear, such that the torque flow path is at least partially provided between the input shaft and the output shaft via the lock-up assembly of the connecting gear engaging the output gear, and the shifter sleeve teeth are aligned with the output gear teeth;
   (4) an engagement phase in which the first actuator is in the second actuation mode and the second actuator is actuated, the third spring is at least partially compressed, the retractable elements of the lock-up assembly remain engaged in the positioning points of the contoured receiving path of the output gear, and the output gear teeth engage the shifter sleeve teeth, such that the torque flow path is provided between the input shaft and the output shaft via the output gear teeth and the shifter sleeve teeth; and
   (5) a running phase in which the first actuator is deactivated and the second actuator remains actuated, the first spring and the second spring return to an expanded state and the third spring remains at least partially compressed, the first friction surface of the synchronizer ring is disengaged from the second friction surface of the output gear, the retractable elements of the lock-up assembly is disengaged from the positioning points of the contoured receiving path of the output gear, and the output gear teeth remain engaged with the shifter sleeve teeth, such that the torque flow path is provided between the input shaft and the output shaft via the output gear teeth and the shifter sleeve teeth.

2. The dual action synchronizing clutch assembly of claim 1, wherein the input shaft includes input shaft splines.

3. The dual action synchronizing clutch assembly of claim 2, wherein the connecting gear includes connecting gear splines meshed with the input shaft splines.

4. The dual action synchronizing clutch assembly of claim 1, wherein the output shaft includes output shaft splines that mesh with output gear splines.

5. The dual action synchronizing clutch assembly of claim 1, wherein the first friction surface of the synchronizer ring and the second friction surface of the output gear each have a frusto-conical profile.

6. The dual action synchronizing clutch assembly of claim 1, wherein the output gear teeth are arranged on a radially outer surface of the output gear, and the shifter sleeve teeth are arranged on a radially inner surface of the shifter sleeve.

7. The dual action synchronizing clutch assembly of claim 1, wherein the synchronizer ring includes synchronizer splines that mesh with the input shaft splines.

8. The dual action synchronizing clutch assembly of claim 1, wherein the lock-up assembly includes a plurality of cups each having a ball, and the positioning points of the contoured receiving path of the output gear include pockets to receive the balls.

9. The dual action synchronizing clutch assembly of claim 1, wherein at least one shaft seal is provided between the input shaft and an input housing.

10. The dual action synchronizing clutch assembly of claim 1, wherein a shaft support bearing is provided between the input shaft and the output shaft.

11. The dual action synchronizing clutch assembly of claim 1, wherein a snap ring engages the input shaft and axially positions the connecting gear on the input shaft.

12. The dual action synchronizing clutch assembly of claim 1, wherein a thrust washer and a thrust bearing is provided between the synchronizer ring and the output shaft and the output gear.

13. A synchronizing assembly for a clutch, the synchronizing assembly comprising:
   a synchronizer ring including a first friction surface and synchronizer teeth;
   a connecting gear including a lock-up assembly with retractable elements, and connecting gear teeth; and
   an output gear including a second friction surface configured to frictionally engage the first friction surface of the synchronizer ring, and a contoured receiving path with positioning points configured to receive the retractable elements of the lock-up assembly.

14. The synchronizing assembly of claim 13, wherein the contoured receiving path is formed as an annular groove.

15. The synchronizing assembly of claim 13, wherein the positioning points include pockets configured to receive the retractable elements.

16. The synchronizing assembly of claim 13, wherein the synchronizer ring includes synchronizer teeth, and the output gear includes synchronizer teeth configured to mesh with the synchronizer teeth.

17. The synchronizing assembly of claim 13, wherein a first spring is arranged between the synchronizer ring and the output gear, and a second spring is arranged between the connecting gear and the synchronizer ring.

18. The synchronizing assembly of claim 13, wherein the first friction surface of the synchronizer ring and the second friction surface of the output gear each have a frusto-conical profile.

\* \* \* \* \*